United States Patent Office 3,060,270
Patented Oct. 23, 1962

3,060,270
PULSE SENDER AND REGISTER
Gabriele F. Cerofolini, Milan, Italy, assignor to Automatic Electric Laboratories, Inc., a corporation of Delaware
Filed Aug. 28, 1959, Ser. No. 836,696
12 Claims. (Cl. 179—18)

My invention relates in general to improvements in register senders and more specifically to a register sender in which transistorized binary registers are controlled from a key sender to store information such as the digits of a called telephone number and gating circuits are used to gate information into and out of the registers as required. The registers are also arranged so that after the stored information has been sent out, the registers may be reset to again store the same information which was previously stored and which thus may be repeatedly transmitted if desired.

In the arrangement illustrated the depression of a key corresponding to a particular digit causes binary markings to be registered in a first register which are complementary to the digit represented by the depressed key. An electronic sequence switch and a series of electronic gating circuits cause the depression of additional keys to register desired digits successively in the other registers. In the present embodiment I have shown only the equipment for registering and retransmitting a series of three digits, but it will be understood that additional registers may be utilized if desired. After storage of the digits, a pulse generator and counter are successively connected to the registers to cause 10 c.p.s. pulses to be transmitted corresponding to the information registered. Pulses of a much higher speed are later connected to the counter and the digit registers to pulse the same to capacity and therefore restore the previously stored information back in each register.

The main object of the invention therefore is to provide a register sender in which information may be stored and transmitted and which may be repeatedly reset to restore the same information and retransmit it.

A feature of the invention is the use of a low speed generator to cause a register to transmit stored information and a higher speed generator to transmit high speed pulses to the register to reset it and restore the same information therein.

Other features of invention will be pointed out in the following detailed description having reference to the accompanying drawings in which.

Referring now to the drawings, I will first give a general description of the various devices shown in the drawing and later a detailed description of the operation of the said devices.

Figure 1:
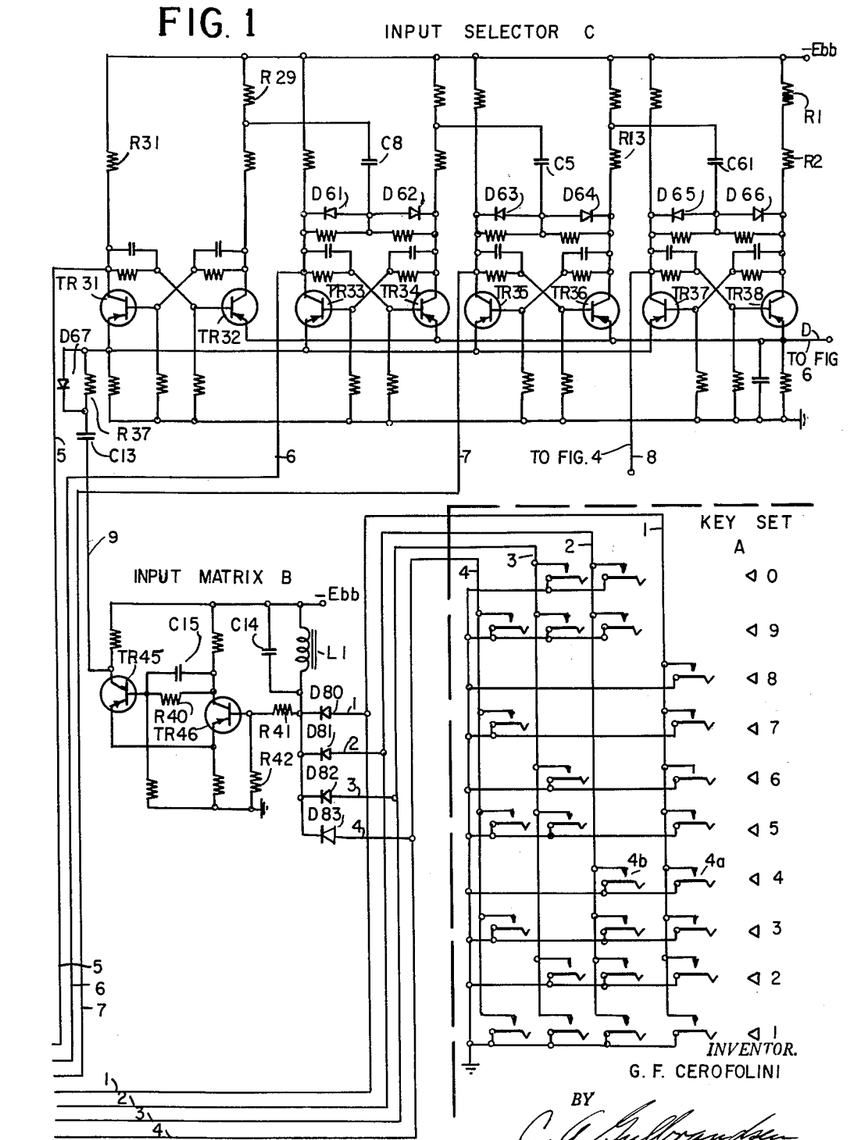
FIG. 1 illustrates a key sender and the input matrix and selectors which comprise a sequence switch for routing information corresponding to successively operated keys of the sender to be registered in successive registers.
Figure 2:
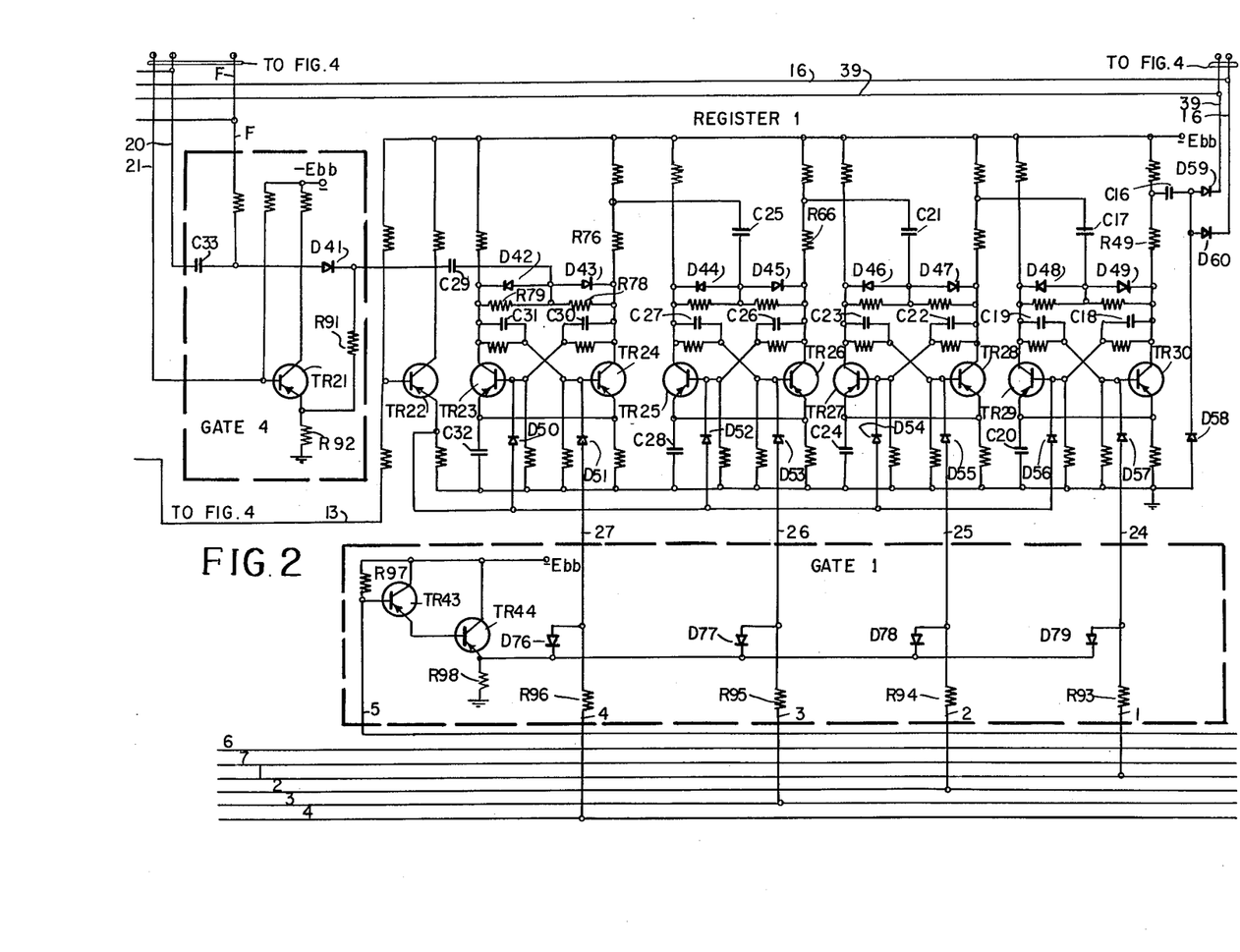
FIG. 2 illustrates a first electronic register and its gate circuits in which information is to be stored.
Figure 3:
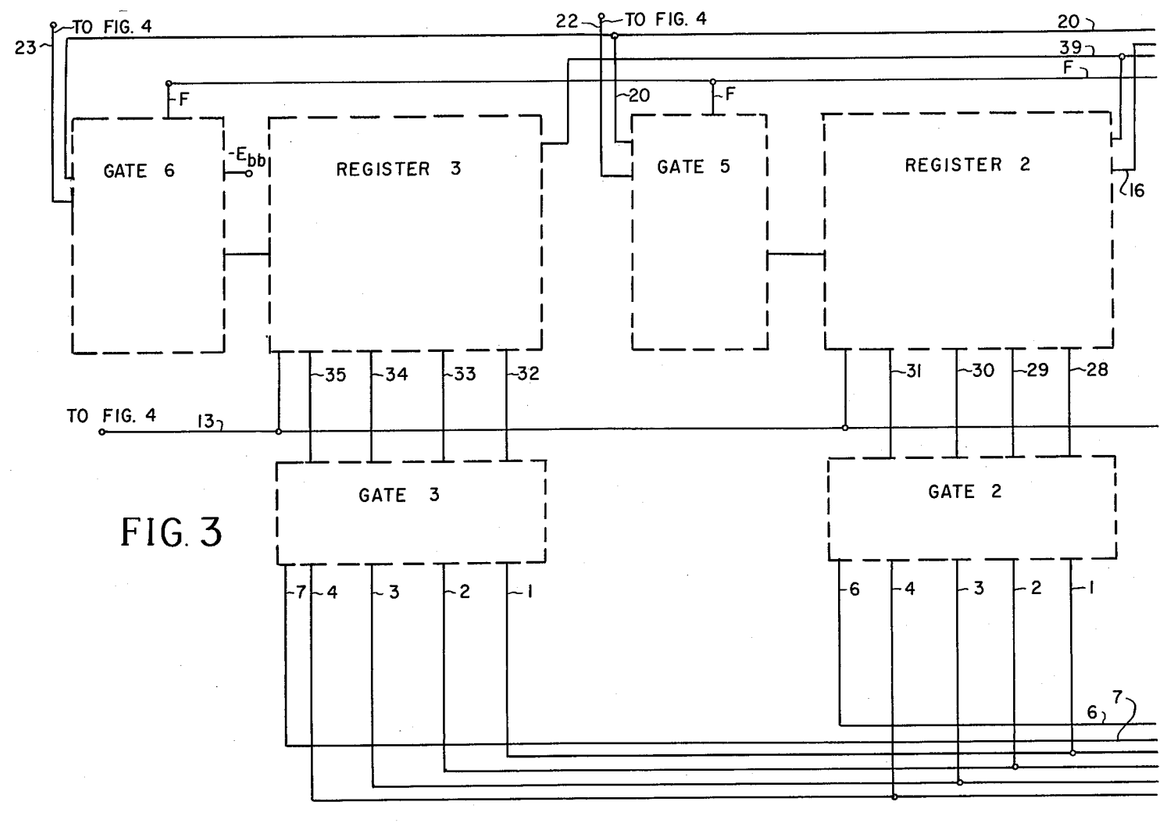
FIG. 3 illustrates in block diagram the next two registers and their gate circuits, each pair being identical as to circuit components with register 1 and gate 1.

In FIG. 1 the key set A is of the usual type with the keys shown diagrammatically such that if the key representing a certain digit is pressed, a ground potential is placed on a particular combination of the leads 1 to 4 extending therefrom to an input matrix B, which in turn controls the sequence selector C, and also to the various gates 1, 2 and 3 of FIGURES 2 and 3 and thence to registers 1, 2 and 3 as the gates are activated.

The register 1 of FIG. 2 comprises four cascaded bistable stages each comprising a pair of transistors such as TR23 and TR24 and associated circuits. As previously stated, the registers 2 and 3 of FIG. 3 are identical with register 1 and function in the same manner when activated by their gate circuits 2 and 3. In normal condition of register 1 the transistors TR24, TR26, TR28, and TR30 are conducting while TR23, TR25, TR27, and TR29 are cut off or non-conducting. Assuming the emitter voltage of the transistors to be $Ve$, then the voltage of the bases of the first group of conducting transistors is also $Ve$ (neglecting the base-emitter voltage drop) and these bases are connected through diodes D51, D53, D55, and D57 with the incoming leads 24, 25, 26, and 27 as shown. These diodes are normally cut off, except when information is being registered on these leads from a depressed key, and have a voltage of substantially $E_{bb}$, lower than $Ve$. These leads 24–27 are continuously connected through diodes D80, D81, D82, and D83 to the bus bar in FIG. 1 through L1 indicated as $E_{bb}$.

The input selector C of FIG. 1 also comprises four pairs of transistors of which TR31, TR34, TR36, and TR38 are conducting and TR32, TR33, TR35, and TR37 are cut off. Assume $Va$ to be the collector voltage of the conducting transistors and $Vb$ the collector voltage of cut off transistors. $Va$ is greater than emitter voltage $Ve$ and $Vb$ is less than $Ve$. In normal position therefore lead 5 from the collector of tube TR31 is at voltage $Va$ and leads 6, 7 and 8 are at voltage $Vb$. Leads 5, 6 and 7 are connected to gates 1, 2 and 3 and each is connected as is lead 5 to emitter followers such as TR43 and 44 of gate 1. Leads 6 and 7 being connected to a similar pair of control transistors in gates 2 and 3 respectively. In normal position the emitter voltage of TR44 is $Va$ while that of the corresponding transistors in gates 2 and 3 is at $Vb$. Gate 1 is open and gates 2 and 3 closed.

Figure 4:
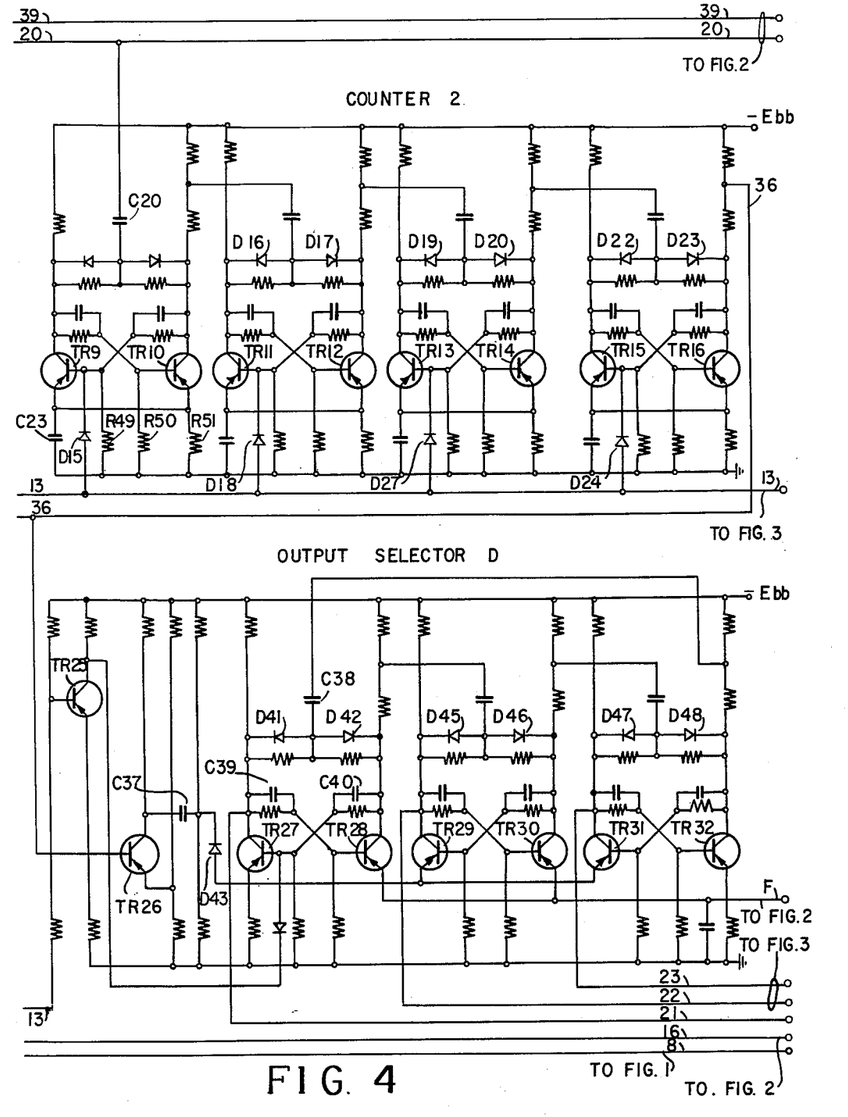
FIGS. 4, 5 and 6 when arranged with FIG. 5 in the center, FIG. 4 on its right and FIG. 6 on its left, illustrate the various components of the sender including the counter 2 and output selector D or sequence switch of FIG. 4, the counter 1, gates 7, 8 and 9 and stages ST1 and ST2 of FIG. 5, and gates 10, 11 and 12, stage ST3 and pulse shaper E of FIG. 6.

The output selector D of FIG. 4 is similar to the input selector C of FIG. 1. The counter 1 of FIG. 5 has a capability of six digits and the counter 2 of FIG. 4 is a 16 digit counter. The trigger stages and gates of FIGS. 5 and 6 and the shaper E will be further described in the detailed description to follow.

Figure 7:
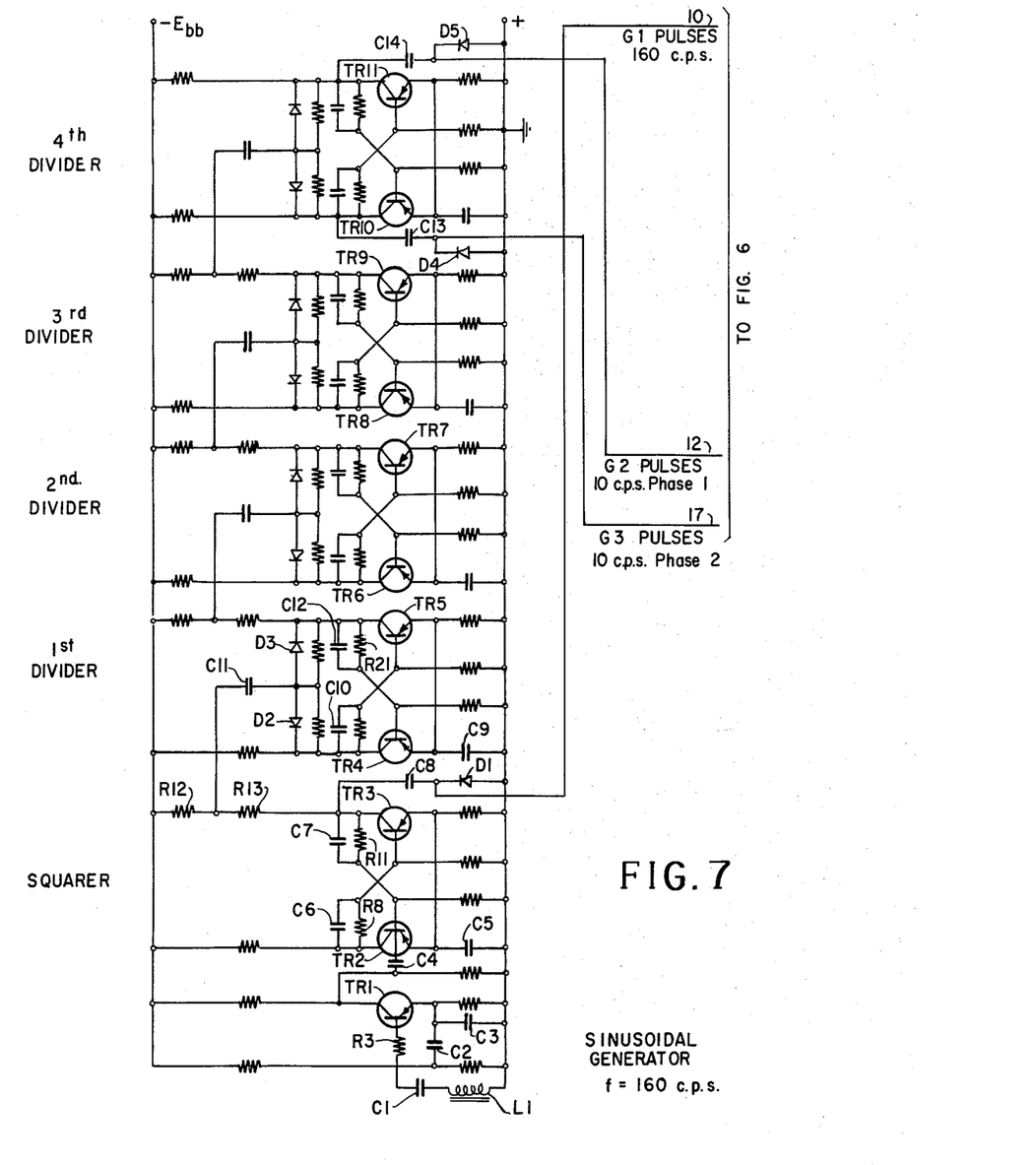
FIG. 7 illustrates a pulse generator of more or less standard type for supplying pulses of 10 c.p.s. and of 160 c.p.s.
Figure 8:
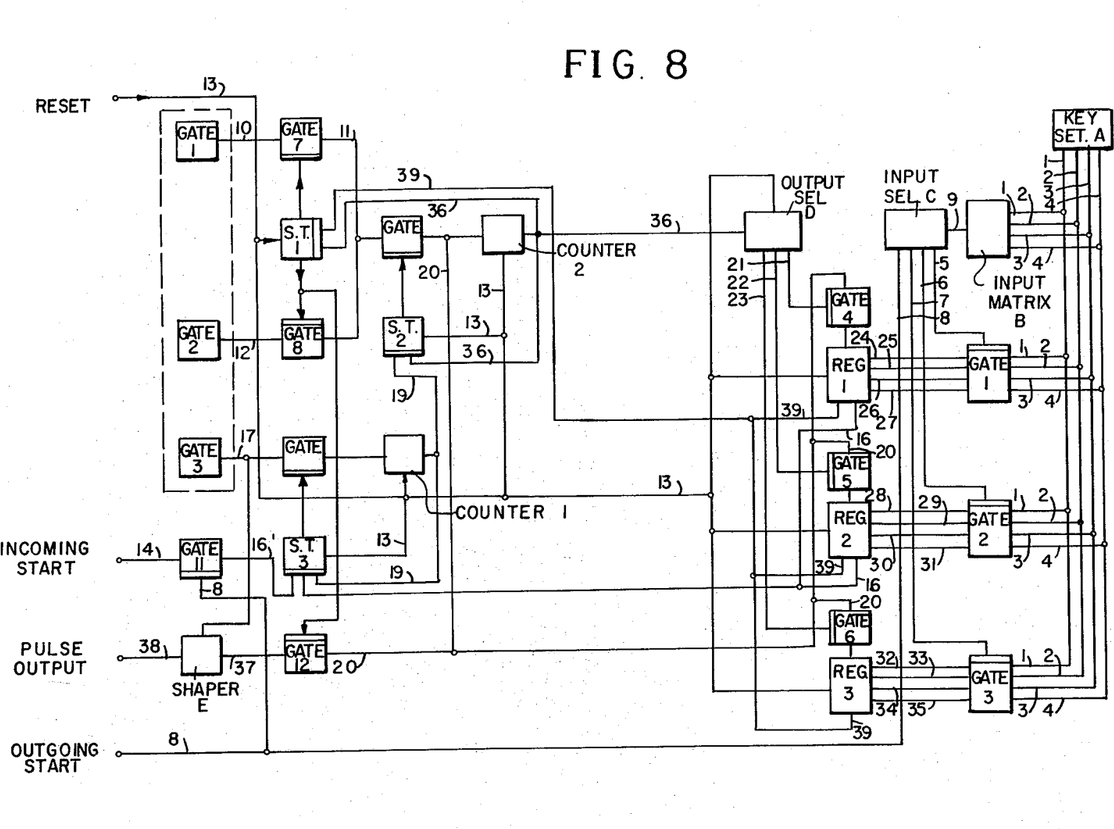
FIG. 8 is a block diagram illustrating the manner in which the various components are linked together.

The oscillator shown in FIG. 7 is of known type and generates a 160 c.p.s. sine wave which feeds a squarer stage. The squared signal is differentiated by condenser C3 and the reverse resistance of D1 which suppresses negative peaks. 160 c.p.s. pulses are available at lead 10. A portion of the squared signal from midpoint of R12 and R13 through C11, feeds the dividing chain of first, second, third, and fourth dividers which are bistable stages, and produce two 10 c.p.s. phase opposed square waves at the collectors of transistors TR10 and TR11. These two 10 c.p.s. square waves are differentiated, the first by C13 and the negative resistance of D4 and the second by C14 and the negative resistance of D5, which diodes D4 and D5 suppress the negative peaks. The 10 c.p.s. pulses available at leads 12 and 17 are synchronized with the 160 c.p.s. pulses on lead 10.

The various units such as the transistorized registers, the gate circuits and the input and output selectors are somewhat similar in type to those shown in the prior applications of Faulkner, Serial No. 601,468, filed August 1, 1956, and Serial No. 601,465, filed August 1, 1956, so that it is not believed that a full detailed description of each operation of the transistors involved need be made. Only the essential operations are described and it is believed that remaining operations will be clear to those skilled in this art.

I will now describe the detailed operations following the operation of a series of keys in the key set A to register a series of three decimal digits. Assume that the operator presses key No. 4 to register a first digit. This operation closes the two sets of springs 4a and 4b controlled by key 4, and shown just to the left thereof in FIG. 1, to apply ground potential to the two leads 1 and 2 extending from the key set A to the input matrix B and to the gates 1, 2 and 3. The leads 1, 2, 3, and 4 are continuously connected to the bus bar $E_{bb}$ through diodes D80–D83 and inductance coil L1. As previously explained, gate 1 is open and gates 2 and 3 closed. The leads 24 and 25 would have a tendency to reach ground voltage but cannot reach a voltage higher than that of the emitter of TR44 because at this voltage the diodes D76, D77, D78 and D79 start conducting. The emitter voltage of TR44 is $Va$ while that of the similar transistors in gates 2 and 3 is $Vb$. The voltage of leads 24 and 25 now reach a value of $Va$, while diodes D55 and D57 are now conducting. TR28 and TR30 are now cut off while TR27 and TR29 are conducting. The third and fourth stages of register 1 (FIG. 2) are therefore reversed while nothing happens in registers 2 and 3. The registers 1, 2 and 3 are 16 digit binary counters, that is, 16 pulses incoming on wire 20 to register 1 would restore it to normal position through its full cycle. The registration of a digit by the key set in register 1 alters the register so that the same conditions are obtained as if a number of pulses equal to $16-n$ ($n$ being the registered digit) had been received over lead 20. Then if $n$ pulses are later sent over wire 20 the register would have returned to normal, while if $16-n$ are then sent in, the register would again have the digit $n$ registered therein.

By the grounding of leads 1 and 2 a circuit is completed through diodes D80 and D81 of input matrix B and inductance L1 which saturates so that when the key 4 is released and the circuit through L1 is opened, it discharges its energy partly across condenser C14 and partly across R41 and R42 and the input impedance of TR46. This triggers the monostable stage TR45—TR46 and a negative pulse appears at the collector of TR45 and over lead 9 to the input selector C. This pulse cuts off TR31 so that the first stage reverses and a positive pulse is sent to the base of TR34. The second stage also reverses and as a result the voltage $Va$ on lead 5 is transferred to lead 6. This closes gate 1 and opens gate 2 while gate 3 remains closed.

When a second key is pressed by the operator to register a second digit, a combination of the leads 1–4 is again grounded to register the second digit in register 2 in the same manner as the first digit was registered in register 1 and to cause the trigger of input matrix C to send another negative pulse to input selector C to cause it to transfer the voltage $Va$ from lead 6 to lead 7 to thereby close gate 2 and open gate 3. The operation of a third key causes similar registration of a third digit in register 3 and to again send a negative pulse to input selector C to cause it to advance a step farther to transfer voltage $Va$ from lead 7 to lead 8 so that gates 1, 2 and 3 are now closed and no further digits can be registered.

Figure 5:
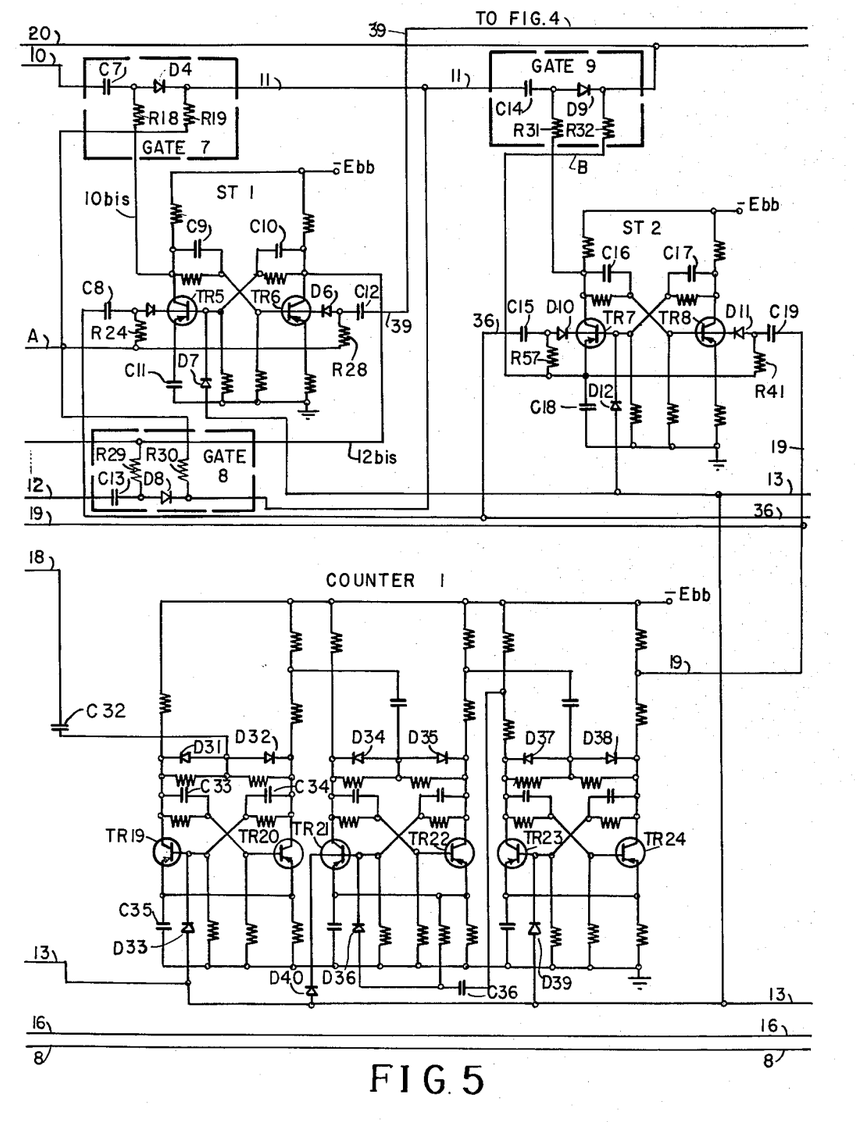
Figure 6:
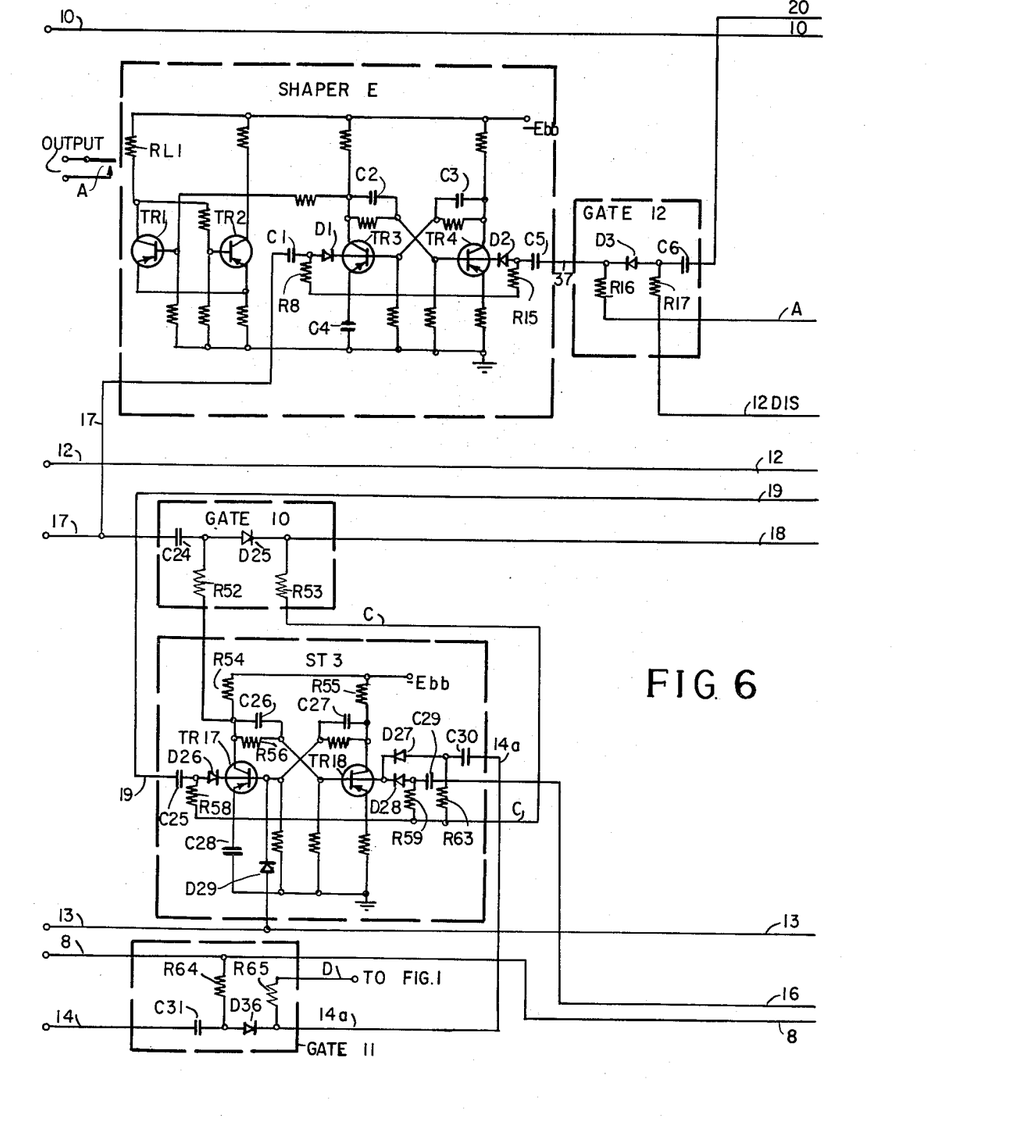

Referring now to the sender components shown in FIGS. 4, 5 and 6, the trigger stage ST1 has its transistor TR5 normally non-conducting and TR6 conducting. Gate 7 is closed since D4 has a strong reverse bias. Gate 8 is open with the same voltage across the terminals R29 and R30. In ST2 the transistor TR7 is normally cut off and TR8 conducts. Gate 9 is closed while TR17 of ST3 is cut off and TR18 conducts, and gate 10 is closed. In counter 1, TR19, TR21 and TR23 are non-conducting, while TR20, TR22 and TR24 are conducting. Counter 1 is a six pulse counter and after the sixth impulse received over lead 18 the original configuration is restored. In counter 2 there are four bistable stages with TR9, TR11, TR13 and TR15 normally non-conducting and TR10, TR12 and TR14 and TR16 conducting. This is a 16 pulse counter and after 16 pulses the counter reaches its original condition and TR16 conducts again.

Assume now that a positive start pulse is received over lead 14 and that at this time the three digits have been registered in registers 1, 2 and 3 so that voltage $Va$ appears on lead 8 to open gate 11 with the proper voltages on conductor D and 8 to make D36 conduct. The incoming start pulse will therefore be applied over lead 14a through C30 and D27 to the base of TR18. Stage ST3 reverses and causes gate 10 to open so that 10 c.p.s. pulses may now pass from lead 17 in FIG. 7 through gate 10 in FIG. 6 and are applied over lead 18 and condenser C32 to counter 1 of FIG. 5. As previously stated, counter 1 consists of three cascaded bistable stages in which the number of stable stages is reduced from eight to six and after the sixth pulse has been received over lead 18 the counter has been returned to zero position and a positive pulse appears on lead 19 to trigger stage ST3 to cause transistor TR17 to cut off to reverse stage ST3 to in turn close gate 10 and therefore stop the pulses from reaching counter 1 and cause it to stop in normal position. The positive pulse on lead 19 is also applied through C19 and D11 to triggers stage ST2 (FIG. 5) which reverses ST2 and thereby applies the proper potentials to R31 and R32 to cause D9 to become conductive and open gate 9. At this time the G2 pulses 10 c.p.s. from lead 12 of the generator of FIG. 7 pass through gate 8 which was open, lead 11, and through gate 9 which has now been opened by the reversal of ST2, and to the input lead 20 to counter 2. Note that the G3 pulses over lead 17 are staggered 50 ms. to those G2 pulses supplied by lead 12 to avoid distortion to the first pulse passing through gate 9. The pulses on lead 20 in addition to operating counter 2 also pass to input lead of register 1 of FIG. 2, through gate 4 which is now open and through condenser C33, D41 and C29, to start restoration of register 1. The pulses on lead 20 also pass to the shaper E of FIG. 6 through gate 12 which is also open. Gates 5 and 6 being closed at this time allow no pulses to pass to registers 2 and 3.

The output selector D of FIG. 4 is similar to input selector C of FIG. 1, with TR27, TR30, and TR32 conducting and TR28, TR29, and TR31 cut off. Voltage $Va$ is therefore applied to lead 21 while voltage $Vb$ is applied on leads 22 and 23 to maintain gate 4 open and gates 5 and 6 closed.

As previously stated, counter 2 has 16 stable states and permits 16 pulses to be transmitted. The register 1 is essentially a binary counter with 16 stable states and the configuration varies as pulses are injected on lead 20. The original configuration as determined by the key pressed and the information stored via leads 24–27, will be again reached after 16 pulses.

The keyset contacts are so arranged that when a key corresponding to digit N (4 in the present instance) is pressed the register receiving this registration will be placed in a configuration as it would have been had it received $16-N$ pulses. As a result, the register reaches its normal position after receiving N pulses over lead 20, and transistor TR30 starts conducting again to place a positive pulse on lead 39.

As the counter 2 now responds to incoming pulses over lead 20, the same pulses reach shaper E over C6 and D3 of gate 12 and eventually to relay RL1 and which transmits proper impulses to any utilization circuit by means of its contacts A. The gate 12 passes pulses to bistable stage TR3 and TR4, while 10 c.p.s. pulses from lead 17 are continuously applied to the base of TR3 through C1 and D1. When a pulse is applied over lead 37, C5 and D2 to the base of TR4 the stage reverses and TR3 conducts until a next pulse is received from lead 17. The short pulses received on the base of TR4 are transformed into 50 ms. rectangular pulses, which energize relay RL1 to repeat the outgoing pulses.

As the first four of the sixteen pulses over lead 20 which are counted out by counter 2 reach register 1 the register is restored to its normal position and tube TR30 is again conducting and causes a positive pulse to appear on lead 39 to trigger stage ST1 (FIG. 5) over condenser C12 and diode D6 to the base of TR6. ST1 reverses to open gate 7 by applying the proper potentials thereto and close gates 8 and 12. This operation shuts off further pulses from reaching shaper E to be transmitted, shuts off pulses from lead 12, and substitutes high speed pulses from lead 10 through gate 7 and gate 9 to counter 2 and to register 1 over lead 20. The 160 c.p.s. pulses over lead 10 now cause counter 2 to count off 16—N rapid pulses and in this case N being 4, a series of 12 rapid pulses are sent to register 1 to again cause it to assume the same configuration it assumed when key 4 was pressed to register digit 4.

As soon as counter 2 reaches its normal position after the 16 pulses are counted, then TR16 starts conducting again and a positive pulse appears on lead 36 extending to output selector D and to trigger stages ST1 and ST2. At the same time that register 1 counted off four impulses to stop transmission of more impulses over lead 20 to shaper E, it also applied a positive pulse on lead 16 leading to stage ST3 to reverse that stage and consequently again open gate 10. The counter 1 is now again fed by pulses from lead 17 through gate 10 and lead 18 to condenser C32 and to counter 1. After approximately 600 ms. the counter 1 has counted off its six pulses and applies the positive pulse to lead 19 to again connect pulses from lead 12 through gates 8 and 9 to counter 1 and, in this case, register 2 of FIG. 3. This provides a pause or space between digits.

As stated, a pulse was received over lead 36 from counter 2 when it reached normal and this pulse causes the output selector D to advance by one step and remove the potential from lead 21 and apply it to lead 22 to open gate 5 and close gate 4. As the potential on lead 22 opens gate 5 the next series of 16 pulses received over lead 20 will pass through gate 5 to register 2, which as stated, is a duplicate of register 1 of FIG. 2, and in which a second digit has been registered over leads 28–31 by the operation of the second digit key. This digit is extracted in the same manner as was the digit 4 in register 1 and a corresponding series of pulses are transmitted over lead 20 and through shaper E to the distant exchange. After counter 2 has transmitted its 16 pulses to register 2 to first send out the digit stored therein, another pulse is sent over leads 39 and 16 to close gate 12 to stop transmission and to send the remaining pulses as high speed pulses to register 2 to restore it to the same configuration as it had when a digit was first stored therein. After counter 2 has allowed the transmission of the full 16 pulses another pulse is sent over lead 36 to operate output selector D to apply potential to lead 23 and remove it from lead 22 and thus open gate 6 (FIG. 3), close gate 5, and restart the transmission of pulses by reversing stages ST1 and ST2. After counter 1 has counted off the interdigital pause the next impulses are transmitted to register 3 to extract therefrom the digit registered therein and cause that same digit to be restored therein. As there is no lead 16 connected from register 3, no further operations will ensue unless another start pulse is sent in on start lead 14, indicating that a retransmission of the stored digits is required at another exchange. In case such start pulse is received the whole procedure is restarted and the restored digits retransmitted.

The lead 13 is connected to all counters and registers and comprises a reset for all registers and equipment which requires resetting if no further transmission of a stored series of digits is required. In case a positive pulse is received over lead 13 all registers are restored to normal position, ready for a second registration.

It will thus be seen that I have provided a novel arrangement of binary transistorized registers together with a transistorized sequence switch which routes successive operations of the keys of a keyset into the registers to register successively therein the binary markings complementary to the digit corresponding to the depressed keys. In the sender, one transistorized counter is operated by 10 c.p.s. pulses to count off a time interval equal to the interdigital pause required between the successive transmission of impulses in a telephone automatic system, and another counter is gated at the proper times to transmit timed pulses to the registers in which the binary markings have been made, to cause transmission of a decimal digit corresponding to the depressed keys. In addition, a series of high speed pulses are then gated into a seized register to operate the transistors therein at high speed to restore therein the binary markings originally registered therein by the depressed keys.

Having fully described and ascertained the features and aspects of my invention, what I consider to be novel and desire to have protected by Letters Patent, will be pointed out in the appended claims.

What is claimed is:

1. In a register sender, a series of registers, each consisting of a number of stages, a keyset, a pulse generator producing direct current impulses of different speeds, means responsive to the successive operation of a key or keys of said keyset for registering information in said registers successively in the form of binary markings complementary to the digits represented by the depressed keys, a counting device, means for operating said counting device to transmit a series of impulses at a certain speed from said generator to the registers one at a time to thereby count off and transmit a series of decimal impulses in accordance with the information registered in each of said registers and to successively restore the various stages of the register to normal, and means for thereafter transmitting to each register, after such impulses have been counted off and transmitted, a series of higher speed impulses from said generator for resetting each register by again successively operating the stages thereof at a high rate of speed to again register therein the same information originally registered.

2. A register sender such as claimed in claim 1 in which there are a series of transistor gate circuits one for each register, and a transistor sequence switch operated by the repeated operation of a key or keys of the keyset to successively render the registers responsive to such operation of the keys to store the information therein.

3. A register sender such as claimed in claim 1 in which each register consists of a series of four cascaded bistable stages of transistors, in which the impulses registered therein are counted out by a counting device also consisting of a series of bistable stages of transistors, and in which there are a series of transistor gate circuits for successively rendering the registers susceptible to binary markings, and another series of transistor gate circuits for successively routing the counting out pulses to the registers.

4. In a register sender, a series of transistorized registers each comprising a series of bistable stages, a keyset, a gate circuit for each register, means responsive to the operation of a first key corresponding to a first digit to be registered for placing a binary marking in the first register in accordance with the digit to be registered by operating certain of the stages therein, and for then closing the gate circuit leading to the first register and opening the gate circuit to the second of said registers, means responsive to the operation of a second key corresponding to a second digit to be registered for placing a binary marking in the second register, a source of low and high speed pulses, means for connecting the low speed pulse source to each register to successively operate certain of the stages thereof to count out and transmit a series of direct current impulses corresponding to the digit registered therein, and means for connecting the source of higher speed pulses to each register after the impulses corresponding to a register have been counted out therefrom, to restore the binary markings in the register by successively operating certain stages thereof, to again register therein the digit originally registered.

5. In a register sender, a register consisting of a series of bistable stages, means for applying a binary marking to said register to place the register in the same state as if a number of impulses had been transmitted thereto equal to the complement of a digit to be registered therein, means for transmitting timed direct current pulses, said pulses effective in the register to step the same on to its normal position a number of steps equal to the registered digit and to transmit a series of direct current impulses corresponding thereto, means responsive to the restoration of the register to normal to stop further transmission of impulses, and means for thereafter transmitting a series of higher speed direct current impulses to the register equal in number to the complement of the number of impulses transmitted to thereby reset the stages to the same state to which they were positioned by said binary marking.

6. In a register sender, a series of registers, a keyset, a gate circuit for each register, an outgoing circuit, a sequence switch, a series of four leads extending from the keyset through the various gate circuits to the registers, one of said gate circuits normally open, means responsive to the operation of a key of the set to place a potential on a combination of said leads to place a binary marking on the first register through the open gate, means also responsive to the potential on said leads for operating the sequence switch to open a second gate circuit to a second register and close the first gate circuit, the subsequent operation of keys in the keyset causing similar binary markings to be placed in said series of registers as the sequence switch opens the gate circuits, a sender, means in the sender, operated after the registers are set, to transmit a series of impulses of direct current corresponding to the value of the registered digit both to the outgoing circuit and to the registers, another sequence switch having means for routing the impulses to the registers successively to count out the digits registered therein and to transmit corresponding numbers of direct current impulses, and means responsive to the receipt by a register of a number of impulses complementary to the digit stored therein by its binary marking, to stop transmission of impulses to the outgoing circuit.

7. A register sender such as claimed in claim 6 in which each register and sequence switch consists of a series of bistable transistor stages.

8. A register sender such as claimed in claim 6 in which there is also means for causing a rapid transmission of impulses to each register after it is returned to normal by the complementary impulses, to place that register in the same state as it was placed by the binary marking, to thereby restore the same digit therein.

9. In a register sender, a keyset, an outgoing impulse circuit, a series of registers each consisting of a series of four bistable stages of transistors, means controlled by the successive operation of keys of the set to register in each register, by means of binary markings, the complement of a digit desired to be transmitted, a pair of counters, one of said counters consisting of four cascaded bistable stages having sixteen stable states, the other counter consisting of a timer of three bistable stages which reaches normal after six pulses have been received, means for applying impulses of a certain speed to the first counter, to the outgoing circuit, and to a register, means controlled by the register to stop transmission to the outgoing circuit, and start transmission to the timing counter after a registered digit has been transmitted, and means for thereafter transmitting impulses of a higher speed to the first counter and to the register to reset the register to the same marking as was originally marked therein, means controlled by said first counter for stopping the high speed impulses and restarting transmission of impulses of said certain speed, after the timing counter has finished its operation.

10. A register sender such as claimed in claim 9 in which there are a series of transistor gate circuits in the register series having means for successively rendering the registers operative by the keys of the keyset, and another series of transistor gate circuits in the sender with means for rendering said last gate circuits effective to start and stop transmission of the impulses to the outgoing circuit under control of the registers, and to switch from low to high speed pulses to the counters after a digit has been transmitted.

11. In a register sender, a series of registers, means for registering in each register a binary marking corresponding to the complement of a digit desired to be transmitted, an incoming impulse circuit leading to each register, means for successively connecting said incoming circuits to a pulse generator and for counting off a series of sixteen impulses to each register, an outgoing pulse circuit, the first group of impulses being transmitted to said outgoing circuit as well as to a register at a certain speed until sufficient pulses have been received by the register to count off a number of pulses equal to the complement of the digit marked therein, and to place the register at normal position, means for then causing the remaining impulses of the series of sixteen to be transmitted to the register at a higher speed to cause the register to take a position corresponding to that in which it was placed by the binary marking.

12. A register such as claimed in claim 11 in which each register consists of a series of bistable cascaded stages and having a series of transistor gate circuits each comprising transistors and diodes with means for successively opening and closing said gates.

References Cited in the file of this patent

UNITED STATES PATENTS

| | | |
|---|---|---|
| 2,854,521 | Morris et al. | Sept. 20, 1958 |
| 2,897,283 | Pearce et al. | July 28, 1959 |